(12) United States Patent
Inamoto et al.

(10) Patent No.: US 10,814,916 B2
(45) Date of Patent: Oct. 27, 2020

(54) VEHICLE FRONT PILLAR STRUCTURE

(71) Applicant: TOYOTA JIDOSHA KABUSHIKI KAISHA, Toyota-shi, Aichi-ken (JP)

(72) Inventors: Yoshiteru Inamoto, Toyota (JP); Toshihiro Yonekura, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 16/197,115

(22) Filed: Nov. 20, 2018

(65) Prior Publication Data
US 2019/0185069 A1 Jun. 20, 2019

(30) Foreign Application Priority Data

Dec. 19, 2017 (JP) .................................. 2017-242605

(51) Int. Cl.
*B62D 25/14* (2006.01)
*B62D 25/08* (2006.01)
*B62D 25/04* (2006.01)

(52) U.S. Cl.
CPC ........... *B62D 25/145* (2013.01); *B62D 25/04* (2013.01); *B62D 25/081* (2013.01)

(58) Field of Classification Search
CPC ..... B62D 25/04; B62D 25/145; B62D 25/081
USPC ........................................ 296/193.02, 193.06
See application file for complete search history.

(56) References Cited

U.S. PATENT DOCUMENTS

| 10,457,332 | B1 * | 10/2019 | Peru ...................... B62D 25/14 |
| 2004/0201253 | A1 | 10/2004 | Kitagawa et al. |
| 2014/0138980 | A1 * | 5/2014 | Baudart ............... B62D 25/145 296/72 |
| 2015/0145237 | A1 * | 5/2015 | Morita ................. B62D 25/147 280/779 |
| 2018/0050730 | A1 * | 2/2018 | Abe ..................... B62D 25/145 |
| 2019/0002032 | A1 * | 1/2019 | Takii .................... B62D 25/081 |

FOREIGN PATENT DOCUMENTS

| JP | 2003-252238 A | 9/2003 |
| JP | 2016-128306 A | 7/2016 |

* cited by examiner

Primary Examiner — Jason S Morrow
(74) Attorney, Agent, or Firm — Oliff PLC

(57) ABSTRACT

A vehicle front pillar structure includes a pair of front pillars disposed on both sides of a vehicle to oppose each other. An instrument panel reinforcement to which a steering portion is attached extends between the pair of front pillars (A-pillars). Each of the A-pillar includes an outer reinforcement disposed on a transversely outer side of the vehicle, an A-pillar inner portion disposed on a transversely inner side of the vehicle, and a reinforcing bracket attached to the outer reinforcement and the A-pillar inner portion. The reinforcing bracket is disposed at a position opposing an end portion of the instrument panel reinforcement.

4 Claims, 7 Drawing Sheets

VEHICLE FRONT PILLAR STRUCTURE

CROSS REFERENCE TO RELATED APPLICATION

The entire disclosure of Japanese Patent Application No. 2017-242605 filed on Dec. 19, 2017, including the specification, claims, drawings, and abstract, is incorporated herein by reference in its entirety.

TECHNICAL FIELD

The present disclosure relates to a vehicle front pillar structure.

BACKGROUND

A four-door vehicle, for example, includes three upright pillar portions on both sides of the vehicle body, namely, a front pillar, a center pillar, and a rear pillar from the front to the rear of the vehicle. Vehicle doors are provided in openings between these pillars. For example, a front side door is provided between the front pillar and the center pillar. In a vehicle, a driver seat and a front passenger seat are provided in a space between the front side doors on both sides of the vehicle.

A cowl extends between the front pillars on both sides of the vehicle. A dashboard which is a partition between a passenger compartment and an engine room is provided below the cowl. A front glass is disposed above the cowl. A pipe-shaped elongated member called an "instrument panel reinforcement" extends between the front pillars on both sides of the vehicle. A steering portion including a steering wheel is attached to the instrument panel reinforcement at a middle position opposing the driver's seat. A side bracket is attached to the instrument panel reinforcement on both ends. The side brackets are respectively secured at both ends of the instrument panel reinforcement and attached to the front pillars on both sides of the vehicle via mounting brackets at both ends of the instrument panel reinforcement.

The front pillar includes a side outer portion and an outer reinforcement which are provided on a transversely outer side of the vehicle and a front pillar inner portion which is provided on a transversely inner side of the vehicle and opposes the side outer portion and the outer reinforcement. The side outer portion, the outer reinforcement, and the front pillar inner portion are attached to each other by welding or other processes to form a frame shape of a closed cross section.

JP 2016-128306A refers to an issue of deformation originating at a bend line between a body portion and a flange portion of the outer reinforcement, and discloses a structure in which a second element is attached to the outer reinforcement by welding.

JP 2003-252238A discloses that the number of peaks in buckling mode waveforms are differentiated between an outer member of a vehicle center pillar having a hollow cross section and a reinforcement inside the outer member, and deformation is dissipated by causing deformation modes to interfere between the outer member and the reinforcement along the longitudinal axis.

SUMMARY

Steering stability of a vehicle depends on lateral rigidity of a steering portion. In order to enhance the steering stability, it is necessary to enhance the rigidity between an instrument panel reinforcement and a front pillar. Lack of rigidity of the front pillar at a position to which the instrument panel reinforcement is attached leads to out-of-plane deformation of the front pillar inner portion due to a steering operation of the steering portion, lowering the steering stability of the vehicle. A front pillar structure of a vehicle which can reduce the out-of-plane deformation of the front pillar inner portion due to a steering operation of the steering portion is desired.

One of the methods to reduce the out-of-plane deformation of the front pillar inner portion due to a steering operation of the steering portion is to enhance the rigidity of a mounting bracket which secures the instrument panel reinforcement onto the front pillar. However, in order to enhance the rigidity of the mounting bracket, it is necessary to use a larger mounting bracket, resulting in a higher cost. Moreover, when the mounting bracket extends to a joint portion between the front pillar and a cowl, the mounting bracket hides a portion to apply the sealant [SB1] on the front pillar inner side. This requires seal coating to be performed in advance, and checking of the sealing operation becomes impossible. A front pillar structure of a vehicle which can reduce out-of-plane deformation of the front pillar inner portion without using a larger mounting bracket is desired. The solutions described below can solve at least one of the above described problems.

Solution to Problem

A vehicle front pillar structure according to the present disclosure includes a pair of front pillars disposed on both sides of a vehicle to oppose each other. An instrument panel reinforcement to which a steering portion is attached extends between the pair of front pillars. Each of the front pillars includes an outer reinforcement disposed on a transversely outer side of the vehicle and a front pillar inner portion disposed on a transversely inner side of the vehicle. Each front pillar also includes a reinforcing bracket attached to the outer reinforcement and the front pillar inner portion. The reinforcing bracket is disposed at a position opposing a position at which an end of the instrument panel reinforcement is attached.

According to the above structure, because the reinforcing bracket can enhance the rigidity of the front pillar at a position where the instrument panel reinforcement is attached, out-of-plane deformation of the front pillar inner portion due to an operation of the steering portion can be reduced.

In a vehicle front pillar structure according to the present disclosure, it is preferable that the outer reinforcement includes a side wall portion which is disposed on an outermost side and extends along a vehicle longitudinal axis; a rear wall portion which extends from the side wall portion and bends towards an inner side of the vehicle with a bend line formed; and a flange wail portion which extends from the rear wall portion and bends towards a rear side of the vehicle with a bend line formed. It is preferable that the reinforcing bracket includes a bracket front wall portion which is attached to the ear wall portion of the outer reinforcement; and a bracket side wall portion which extends from the bracket front wall portion and bends towards the rear side of the vehicle with a bond line formed. It is preferable that the bracket side wall portion is attached to the front pillar inner portion.

According to the above structure, because the reinforcing bracket is attached to the rear wall portion of the outer reinforcement and the front pillar inner portion, the rigidity of the front pillar is enhanced, reducing out-of-plane deformation of the front pillar inner portion due to an operation of the steering portion.

In a vehicle front pillar structure according to the present disclosure, a cowl may extend between the pair of front pillars. The vehicle front pillar structure may include a mounting bracket which attaches, to the front pillar inner portion, a side bracket at each of end portions of the instrument panel reinforcement which extends along a transverse axis of the vehicle. The mounting bracket may be shorter, along a longitudinal axis of the vehicle, than a distance of a clearance between the side bracket and the cowl.

According to the above structure, because the reinforcing bracket enhances the rigidity of the front pillar at a position where the instrument panel reinforcement is attached, the length of the mounting bracket along the longitudinal axis of the vehicle can be shorter than the distance between the side bracket and the cowl. In this way, out-of-plane deformation of the front pillar inner portion can be reduced without using a larger mounting bracket.

In a vehicle front pillar structure according to the present disclosure, it is preferable that the front pillar inner portion includes a region which is not covered by the mounting bracket along the longitudinal axis of the vehicle in the clearance between the side bracket and the cowl, and the region is accessible by an operator for manual work.

According to the above structure, because the front pillar inner portion can include a region which is not covered by the mounting bracket, an operator can perform a manual operation, such as sealant application [SB2], in the region.

Advantageous Effects of Invention

A front pillar structure having the above described structures can reduce out-of-plane deformation of a front pillar inner portion due to a steering operation of a steering portion. In this way, a larger mounting bracket becomes unnecessary.

DESCRIPTION OF EMBODIMENTS

Embodiments according to the present disclosure are described in detail below with reference to the attached drawings. Although right-hand drive vehicles are described as an example for description below, a vehicle front pillar structure according to the present disclosure is also applicable to left-hand drive vehicles.

Details such as shapes and materials described below are provided merely as examples. These details can be changed as necessary according to specifications or other requirements of the vehicle front pillar structure. Throughout the drawings, the same reference numbers are assigned to similar elements, and redundant description is omitted.

Figure 1:
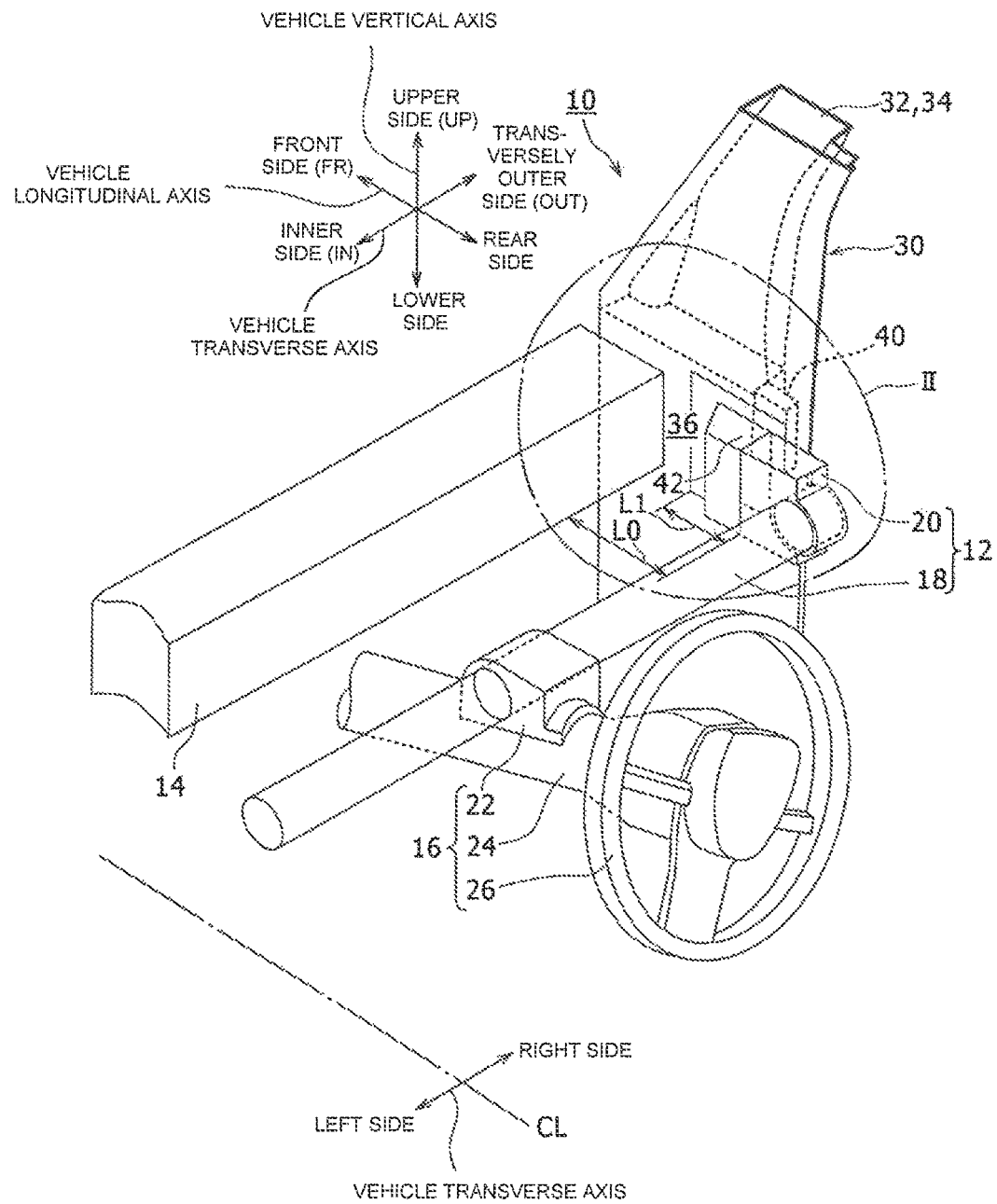
FIG. 1 is a perspective diagram showing a vehicle front pillar structure according to an embodiment of the present disclosure.

FIG. 1 is a perspective diagram showing a vehicle front pillar structure 10. A front pillar is also called an "A-pillar". Unless otherwise specified, the vehicle front pillar structure 10 is called an A-pillar structure 10. The A-pillar structure 10 is a structure of a vehicle front pillar 30. In the description below, unless otherwise specified, the vehicle front pillar 30 is called an "A-pillar 30".

The drawings show a vehicle transverse axis, a vehicle longitudinal axis, and a vehicle vertical axis, where applicable. Elements in the A-pillar structure 10 on both sides of the vehicle are in many cases symmetrically positioned with respect to the vehicle transverse axis. Regarding positions along the transverse axis, a center axis CL is used to describe the direction along the transverse axis in such a manner that the distance from the outside of the vehicle towards the center axis CL is described as "IN" and the direction from the center axis CL towards the outside of the vehicle as "OUT". The right and left along the transverse axis are described as "right of the vehicle" and "left of the vehicle". Regarding positions along the longitudinal axis, "FR" denotes the front of the vehicle and the opposite side is the rear of the vehicle. Regarding positions along the vertical axis, "UP" denotes the up side with respect to a road surface and the opposite side towards the road surface is the down side.

In FIG. 1, the A-pillar structure 10 of the A-pillar 30 on the right side of the vehicle with respect to the center axis CL is shown for a right-hand drive vehicle. FIG. 1 also shows an instrument panel reinforcement 12, a cowl 14, and a steering portion 16, all of which are not included in the A-pillar structure 10.

The instrument panel reinforcement 12 is an elongated member extending between the A-pillars 30 on both sides of the vehicle. The steering portion 16 is disposed at a middle position along the longitudinal axis of the instrument panel reinforcement 12. The instrument panel reinforcement 12 includes a reinforcement shaft 18 which is a substantially cylindrical pipe and side brackets 20 at both ends of the reinforcement shaft 18. Each side bracket 20 includes a cylinder supporting portion which supports the reinforcement shaft 18 having a substantially cylindrical shape on an outer circumferential surface and a bracket portion which is integrally provided with the cylinder supporting portion and has a planer wall surface. A mounting bracket 42 described below is attached to the planer wall surface of the bracket portion.

It should be noted here that, in the above description, "attached" means that two elements are attached by using one or more processes of laser welding, spot welding, and fastening with a bolt and a nut. This also applies to descriptions below.

The cowl 14 extends between the A-pillars 30 on both sides of the vehicle so that both ends are attached to the A-pillars 30. A dash panel (not shown) which is a partition between a passenger compartment and an engine compartment is attached below the cowl 14, whereas a front glass (not shown) is provided above the cowl 14.

The steering portion 16 includes a steering column supporting portion 22 which is secured to the reinforcement shaft 18, a steering column 24, and a steering wheel 26. The steering column 24 internally includes a steering mechanism which includes an intermediate shaft, a gear, and any other mechanism. The intermediate shaft is connected to vehicle turning wheels (not shown) so that the vehicle turning wheels are turned via the steering mechanism when a driver turns the steering wheel 26.

As described above, the steering operation of the steering wheel 26 is performed while the steering wheel 26 is supported at the steering column supporting portion 22 which is secured on the instrument panel reinforcement 12 including the reinforcement shaft 18. Thus, turning force of the steering wheel 26 is transferred to the A-pillar 30 via the instrument panel reinforcement 12. If the A-pillar 30 lacks rigidity, out-of-plane deformation of the A-pillar 30 would be caused by the turning force of the steering wheel 26, affecting the steering stability.

Although the instrument panel reinforcement 12 and the cowl 14 are described in FIG. 1 to have uniform cross sections along the transverse axis as merely examples for description, the shapes can be changed in accordance with specifications of the vehicle. For example, although the instrument panel reinforcement 12 is described to have a substantially cylindrical pipe shape with a uniform cross section extending straight along the transverse axis, the instrument panel reinforcement 12 may have different cross sections along the transverse axis, or curve instead of extending straight.

Among the three upright column portions provided on a side surface of a vehicle body, the A-pillar 30 is the front-most column portion. A front glass is provided on a front side of the A-pillar 30, whereas a front side door is provided on a rear side. On the outer side, the A-pillar 30 includes a side outer portion 32 and an outer reinforcement 34. On the inner side, the A-pillar 30 includes a front pillar inner portion 36 which opposes the side outer portion 32 and the outer reinforcement 34. These elements are attached to each other by welding or other processes to form a frame shape having a closed cross section. In the description below, unless otherwise described, the front pillar inner portion 36 is called an "A-pillar inner portion 36".

A reinforcing bracket 40 is disposed in a space between the outer reinforcement 34 and the A-pillar inner portion 36 to reduce out-of-plane deformation of the A-pillar 30 due to a turning force of the steering wheel 26. The reinforcing bracket 40 is attached to the outer reinforcement 34 and the A-pillar inner portion 36 respectively by welding. The reinforcing bracket 40 is disposed in the A-pillar 30 at a position opposing an end portion of the instrument panel reinforcement 12. The reinforcing bracket 40 is described in detail further below.

The mounting bracket 42 attaches the side bracket 20 of the instrument panel reinforcement 12 to the A-pillar inner portion 36. The mounting bracket 42 includes two flat walls 70, 72 which are substantially perpendicular to each other. The mounting bracket 42 has a closed cross section enclosed by four walls. Of the two substantially perpendicular walls, one flat wall 70 is attached to a flat wall of the bracket portion of the side bracket 20, whereas the other flat wall 72 is attached to the A-pillar inner portion 36 (refer to FIG. 3). A length L1 of the mounting bracket 42 along a longitudinal axis of the vehicle is shorter than a distance L0 between a front surface of the side bracket 20 and a rear surface of the cowl 14. In other words, the mounting bracket 42 is not attached to the cowl 14. The mounting bracket 42 is described in detail further below.

Figure 2:
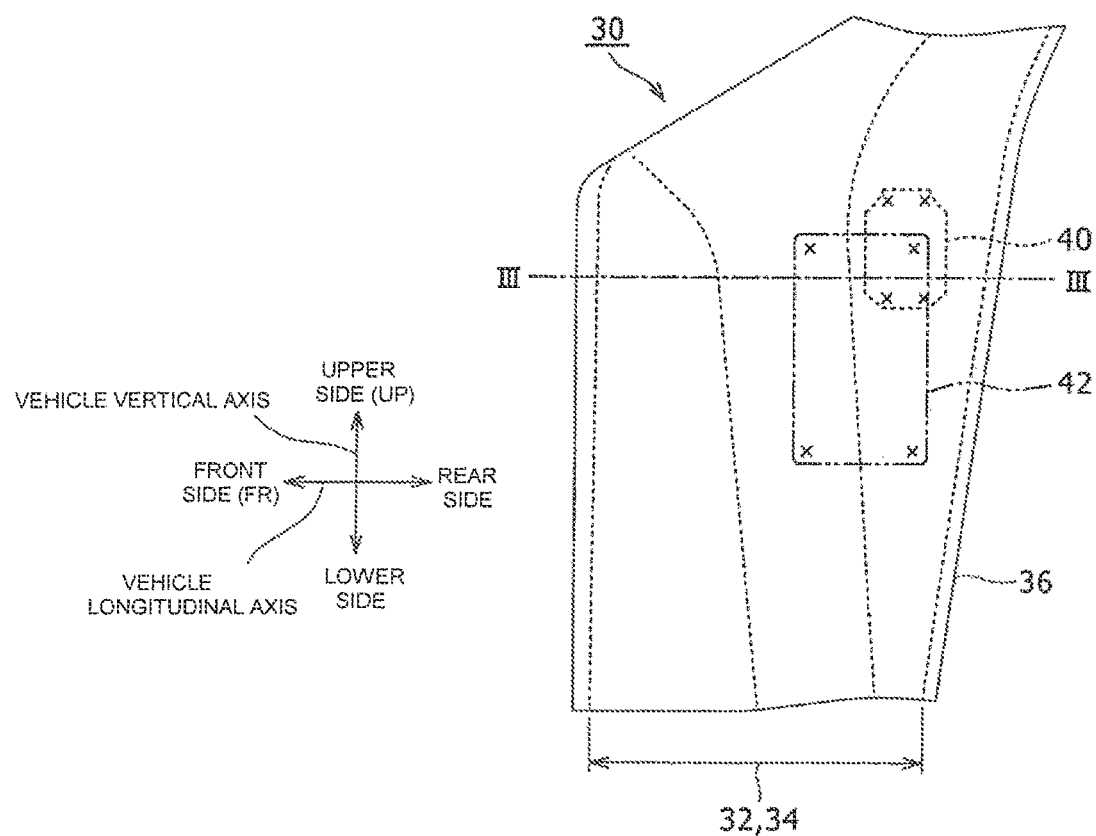
FIG. 2 is a diagram of a section II in FIG. 1, viewed from an inner side of the vehicle.

FIG. 2 shows the A-pillar 30 in section II in FIG. 1, viewed from the inner side of the vehicle. The solid line represents an outline of the A-pillar inner portion 36, and broken lines represent outlines of the side outer portion 32 and the outer reinforcement 34. The reinforcing bracket 40 is represented by a broken line because the reinforcing bracket 40 is positioned on the outer side of the A-pillar inner portion 36. The four X marks around the edge represent joint portions between the reinforcing bracket 40 and the A-pillar inner portion 36. The mounting bracket 42 which is positioned on the inner side of the A-pillar inner portion 36 is represented by a dash-two-dot line. The four X marks represent joint portions between the mounting bracket 42 and the A-pillar inner portion 36. As shown in FIG. 2, the reinforcing bracket 40 is disposed to oppose a position where the A-pillar inner portion 36 is attached. In other words, the reinforcing bracket 40 is disposed to oppose a position where the instrument panel reinforcement 12 is attached to the A-pillar inner portion 36.

Figure 3:
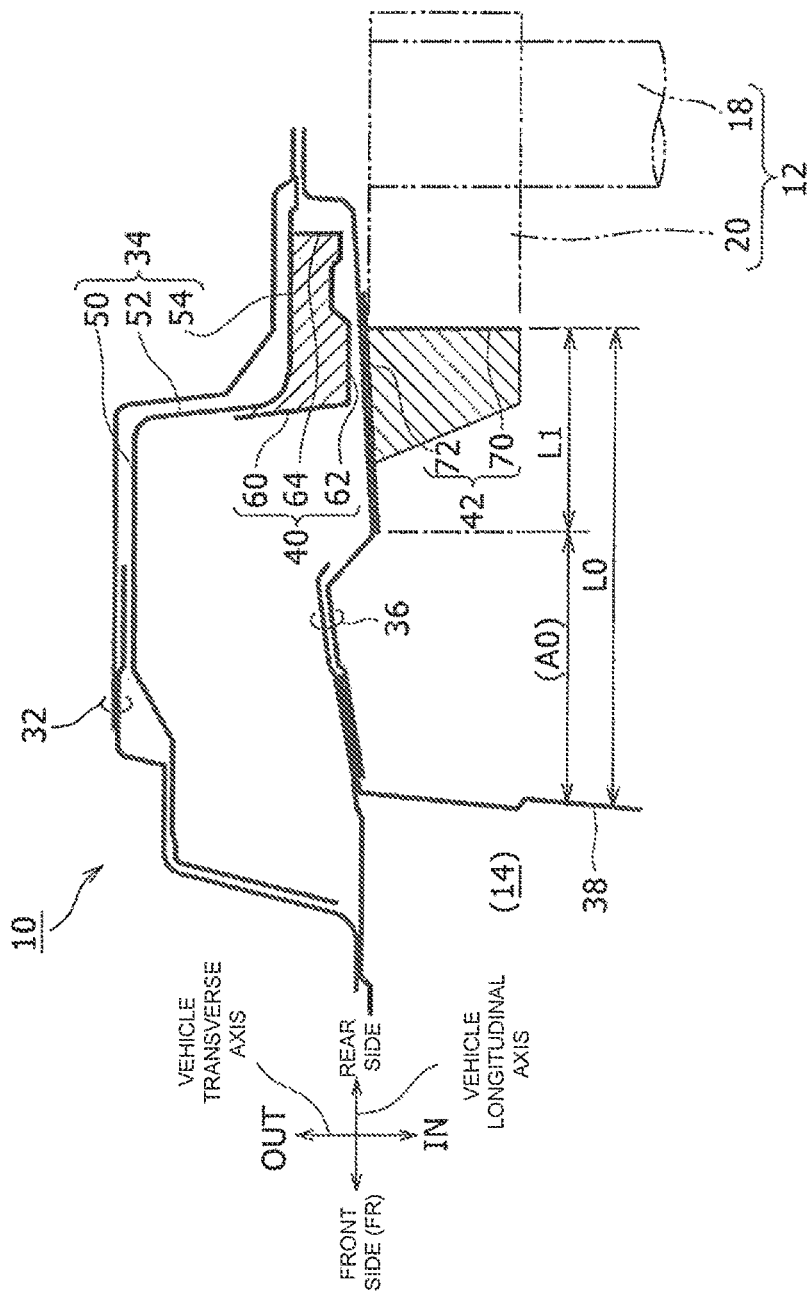
FIG. 3 is a cross sectional view taken along line III to III in FIG. 2.

FIG. 3 is a cross sectional view taken alone line III-III in FIG. 2. Line III-III in FIG. 2 is a section line along the longitudinal axis of the vehicle crossing the reinforcing bracket 40 and the mounting bracket 42.

In a plane taken along III-III, the side outer portion 32 forms an outermost outline of the A-pillar 30, with two elements attached to each other. The outer reinforcement 34 is overlapped and attached to the side outer portion 32 on the inner side of the side outer portion 32. Together with the side outer portion 32, the outer reinforcement 34 forms an outline of the A-pillar 30 on the outer side, having a cross section like a top hat. FIG. 3 shows a side wall portion 50 extending along the vehicle longitudinal axis on the outermost side of the hat shape, a rear wall portion 52 which extends from the side wall portion 50 and bends towards the inner side with a bend line formed, and a flange wall portion 54 which extends from the rear wall portion 52 and bends towards the rear side with a bend line formed.

In a plane taken along line III-III, the A-pillar inner portion 36 forms an inner side outline of the A-pillar 30, with two elements attached to each other. A front end of the A-pillar inner portion 36 is attached to a front end of the side outer portion 32, whereas a rear end of the A-pillar inner portion 36 is attached to a rear end of the side outer portion 32 and a rear end of the flange wall portion 54 of the outer reinforcement 34. In this way, the A-pillar 30 having a closed cross section is formed. In a plane taken along line III-III, the A-pillar inner portion 36 is attached to a member 38 on the rear side of the cowl 14.

The reinforcing bracket 40 is disposed in a space between the flange wall portion 54 of the hat-shaped outer reinforcement 34 and the A-pillar inner portion 36. The reinforcing bracket 40 includes a bracket front wall portion 60 which is attached to the rear wall portion 52 of the outer reinforcement 34 in a plane taken along line III-III. The reinforcing bracket 40 also includes a bracket side wall portion 62 which extends from the bracket front wall portion 60 and bends towards the rear side with a bend line formed and be attached to the A-pillar inner portion 36. An end wall portion 64 extends from the bracket side wall portion 62 and bends towards the outer side with a bend line formed. The three wall portions (the bracket front wall portion 60, the bracket side wall portion 62, and the end wall portion 64) of the reinforcing bracket 40 and the flange wall portion 54 of the outer reinforcement 34 form a closed cross section. In this way, because the reinforcing bracket 40 forms a closed cross section by being attached to the outer reinforcement 34 and the A-pillar inner portion 36, the reinforcing bracket 40 can enhance rigidity of the A-pillar 30 on the rear side. This can reduce possible out-of-plane deformation of the A-pillar 30 due to turning force of the steering wheel 26 of the steering portion 16 via the instrument panel reinforcement 12.

The mounting bracket 42 includes two flat walls which are substantially perpendicular to each other. The mounting bracket 42 has a closed cross section enclosed by four walls. Of the two substantially perpendicular flat walls, one flat wall 70 is attached to the flat wall of the bracket portion of the side bracket 20, whereas the other flat wall 72 is attached to the A-pillar inner portion 36. Because the instrument panel reinforcement 12 is attached to the A-pillar inner portion 36 via the mounting bracket 42, the turning force of the steering wheel 26 of the steering portion 16 acts on the A-pillar inner portion 36 via the mounting bracket 42. Because the rigidity of the A-pillar 30 on the rear side is enhanced by the reinforcing bracket 40, impact of the turning force of the steering wheel 26 may not have to be considered too significant in determining rigidity of the mounting bracket 42. Thus, because the length L1 of the second flat wall 72 of the mounting bracket 42 along the A-pillar inner portion 36 can be a length required for mounting, the length L1 can be shorter than the distance L0 between the front surface of the side bracket 20 of the instrument panel reinforcement 12 and the rear surface of the cowl 14. In the distance L0, a region A0 which is not covered by the flat wall 72 of the mounting bracket 42 is operator accessible, enabling sealing or other operations.

Advantageous effects of the front pillar structure 10 having the above described structure are described in more detail below with reference to FIGS. 4 to 7. Corresponding to FIG. 3, these drawings show cross sections taken along line III-III in FIG. 2.

Figure 4:
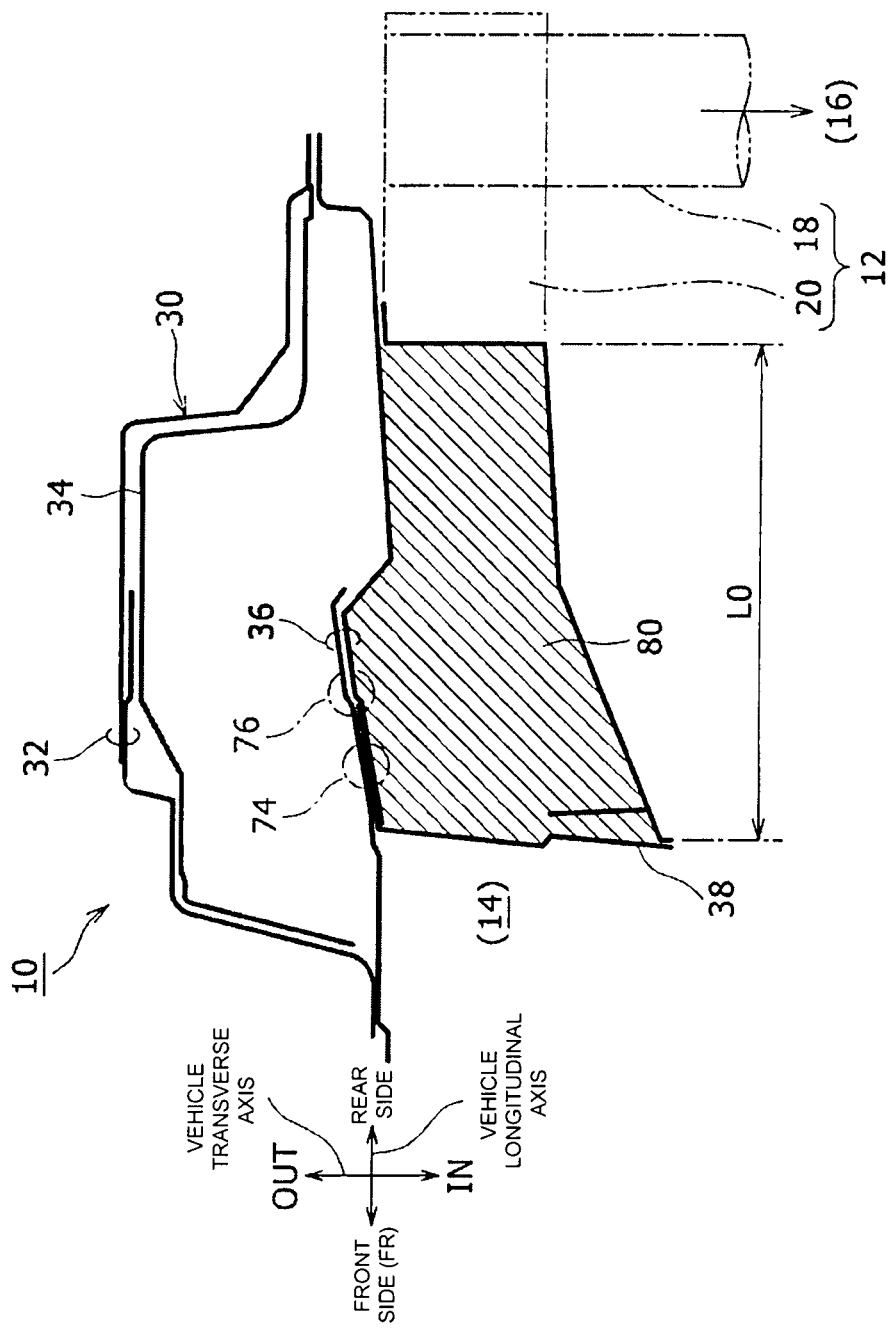
FIG. 4 shows, in a drawing corresponding to FIG. 3, a prior art structure including a large mounting bracket as a comparative example to describe an advantageous effect of a vehicle front pillar structure according to an embodiment of the present disclosure.

FIG. 4 shows an example of the structure 10 provided with a prior art mounting bracket 80. The prior art mounting bracket 80 has a closed cross section. The prior art mounting bracket 80 is attached to the A-pillar inner portion 36 for the entire distance L0 between the front surface of the side bracket 20 of the instrument panel reinforcement 12 and the rear surface of the cowl 14. This enhances the rigidity of the A-pillar inner portion 36 such that steering stability can be achieved with almost no out-of-plane deformation of the A-pillar inner portion 36 due to the turning force of the steering wheel 26. However, the mounting bracket 80 becomes larger, more costly, and heavy, adding weight to the vehicle. Because the surface of the A-pillar inner portion 36 along line III-III is covered by the prior art mounting bracket 80 for almost the entire length, joints 74, 76 at which two or more elements of the A-pillar inner portion 36 are attached become inaccessible, disabling, for example, manual sealing operations. In such a case, while, for example heat sealing using a foam sealing material may be performed, visual inspections of sealability (or seal state) [SB3] are impossible.

Figure 5:
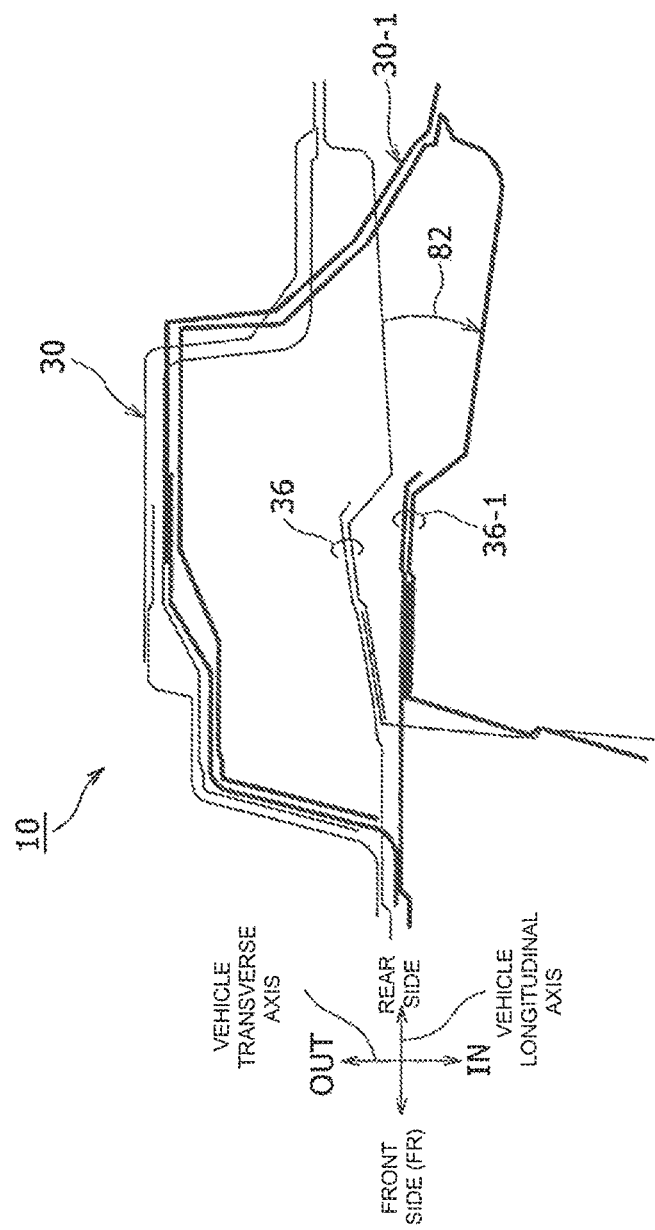
FIG. 5 shows, in a drawing corresponding to FIG. 3, out-of-plane deformation of a front pillar which would be caused without a large mounting bracket in a prior art structure as a comparative example to describe an advantageous effect of a vehicle front pillar structure according to an embodiment of the present disclosure.

FIG. 5 shows how the turning force of the steering wheel 26 acts when the prior art mounting bracket 80 is omitted. Thin lines represent a cross section of the A-pillar 30 when the steering wheel 26 is not turned as in FIG. 3, whereas bold lines represent a cross section of an A-pillar 30-1 when the steering wheel 26 is turned. Out-of-plane deformation 82 occurs such that the A-pillar inner portion 36 shown by the thin lines deforms to the A-pillar inner portion 36-1 shown by the bold lines. This results in degraded steering stability.

Figure 6:
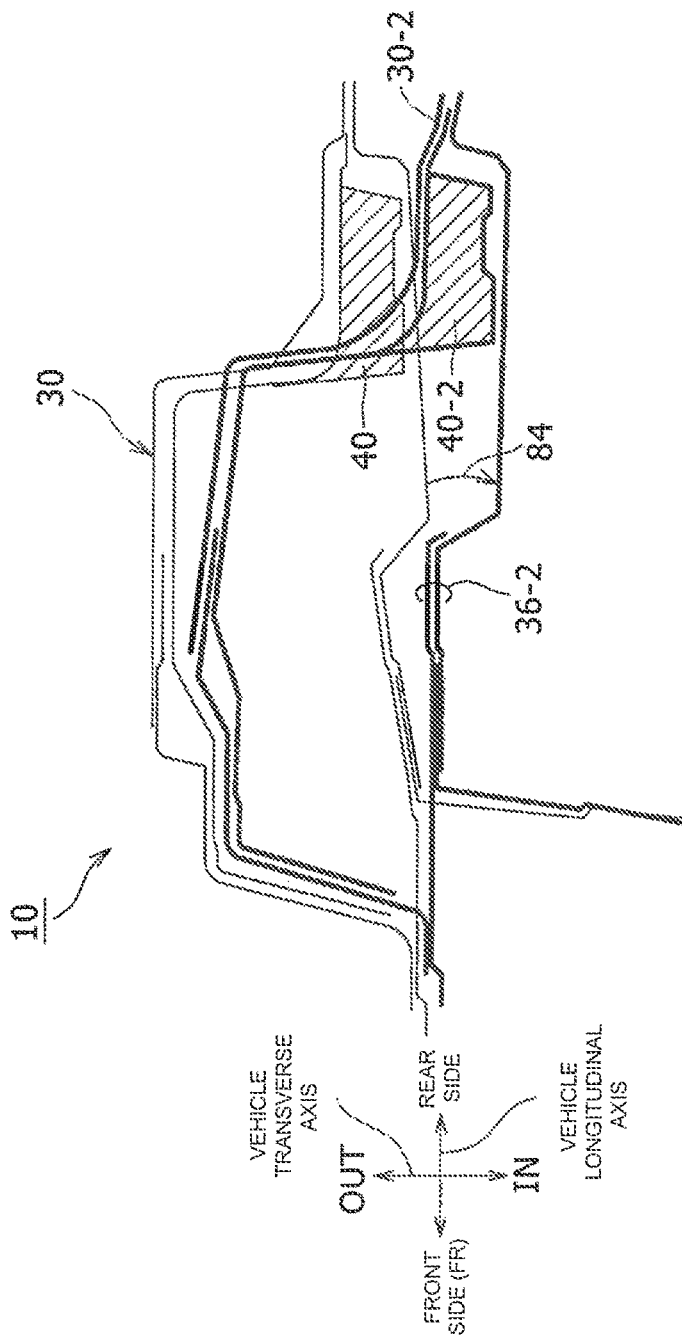
FIG. 6 is a diagram showing a front pillar out-of-plane deformation reducing effect achieved by a reinforcing bracket in a vehicle front pillar structure according to an embodiment of the present disclosure.

FIG. 6 shows how the turning force of the steering wheel 26 acts when the reinforcing bracket 40 is disposed without the large prior art mounting bracket 80. Thin lines represent a cross section of the A-pillar 30 when the steering wheel 26 is not turned as in FIG. 3, whereas bold lines represent a cross section of an A-pillar 30-2 when the steering wheel 26 is turned. While out deformation 84 of an A-pillar inner portion 36-2 is caused, the out-of-plane deformation is kept smaller than that in FIG. 5. Such a small out-of-plane deformation 84 does not significantly affect the steering stability.

Figure 7:
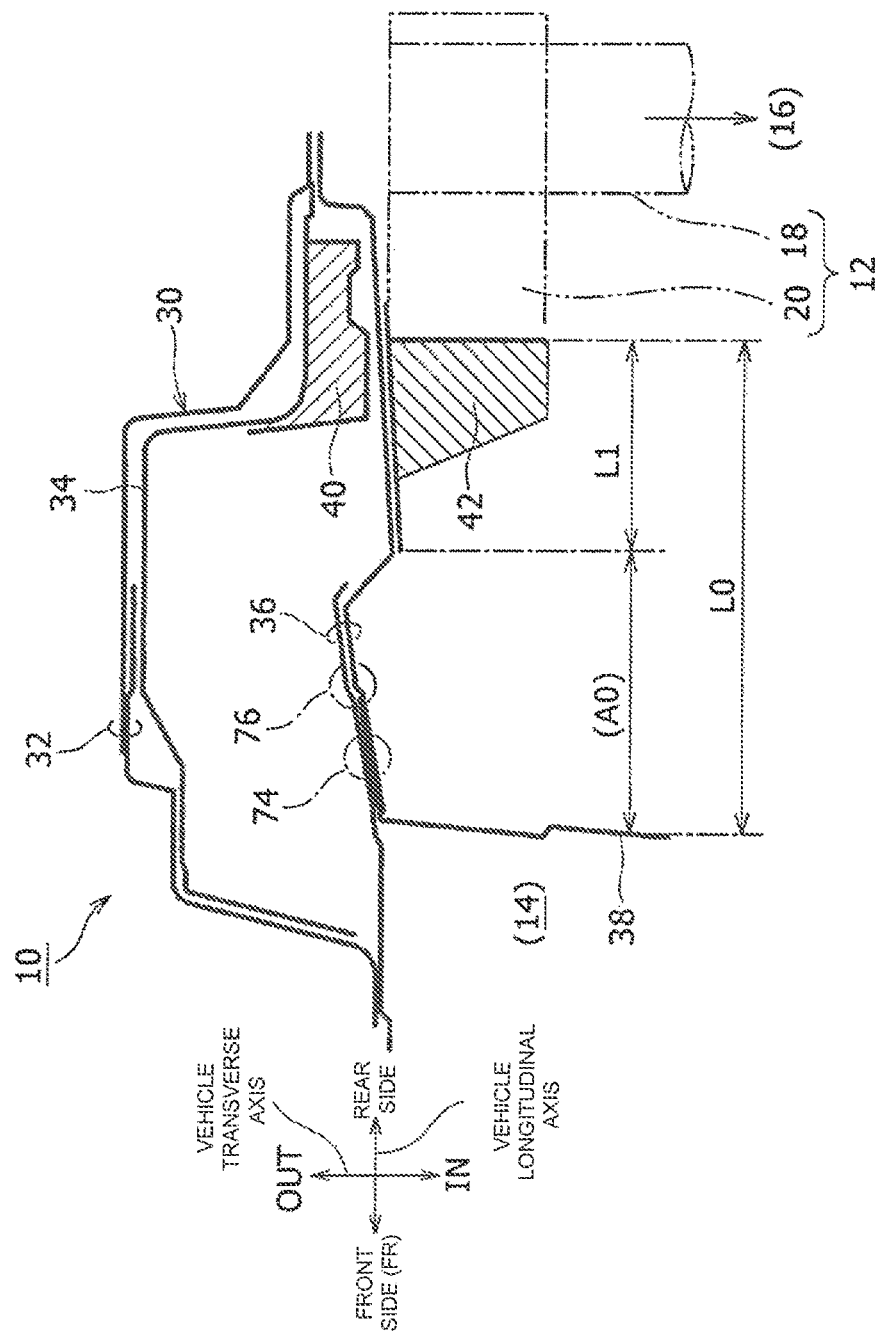
FIG. 7 is a diagram showing an advantageous effect of a vehicle front pillar structure according to an embodiment of the present disclosure in which seal painting is enabled.

FIG. 7 is identical to FIG. 3. In this case, because the rigidity of the A-pillar 30 can be enhanced by the reinforcing bracket 40 to reduce the out-of-plane deformation of the A-pillar inner portion 36 due to the turning force of the steering wheel 26, the size of the mounting bracket 42 can be reduced. Accordingly, the length L1 of the mounting bracket 42 along line III-III can be made shorter than the distance L0 between the front surface of the side bracket 20 of the instrument panel reinforcement 12 and the rear surface of the cowl 14. In this way, the region A0 where the A-pillar inner portion 36 is not covered with the mounting bracket 42 can be achieved in a plane taken along line III-III. Manual sealing and visual inspections of the sealability (or seal state) sealability become possible at joints 74, 76 between two or more elements of the A-pillar inner portion 36 in the region A0. Reliability of the products can be improved.

As described above, because the rigidity of the A-pillar 30 at a position where the instrument panel reinforcement 12 is attached can be enhanced by the reinforcing bracket 40 according to the front pillar structure 10, the out-of-plane deformation of the A-pillar inner portion 36 due to operation of the steering portion 16 can be reduced. Further, because the size of the mounting bracket 42 can be reduced, the region A0 where the A-pillar inner portion 36 is not covered with the mounting bracket 42 can be formed. Because an operator can perform a manual operation in this region, for example, sealing operation can be performed.

REFERENCE NUMERALS

10 A-pillar structure (vehicle front pillar structure), 12 instrument panel reinforcement, 14 cowl, 16 steering portion, 18 reinforcement shaft, 20 side bracket, 22 steering column supporting portion, 24 steering column, 26 steering wheel, 30 A-pillar (front pillar), 32 side outer portion, 34 outer reinforcement, 36 A-pillar inner portion, 38 member, 40 reinforcing bracket, 42 mourning bracket, 50 side wall portion, 52 rear wall portion, 54 flange wall portion, 60 bracket front wall portion, 62 bracket side wall portion, 64 end wall portion, 70, 72 flat wall, 74, 76 joint, 80 prior art mounting bracket, and 82, 84 out-of-plane deformation.

The invention claimed is:

1. A vehicle front pillar structure comprising a pair of front pillars disposed on both sides of a vehicle to oppose each other, wherein an instrument panel reinforcement to which a steering portion is attached extends between the pair of front pillars, each of the front pillars comprising:

an outer reinforcement disposed on a transversely outer side of the vehicle;

a front pillar inner portion disposed on a transversely inner side of the vehicle; and a reinforcing bracket attached to the outer reinforcement, wherein:

the outer reinforcement is attached to the front pillar inner portion, an end of the instrument panel reinforcement is attached to the front pillar inner portion, and the reinforcing bracket is disposed at a position opposing to a position at which the end of the instrument panel reinforcement is attached to the front pillar portion.

2. The vehicle front pillar structure according to claim 1, wherein the outer reinforcement comprises a side wall portion disposed on an outermost side, extending along a vehicle longitudinal axis;

a rear wall portion extending from the side wall portion and bending towards an inner side of the vehicle with a bend line formed;

a flange wall portion extending from the rear wall portion and bending towards a rear side of the vehicle with a bend line formed, wherein the reinforcing bracket comprises a bracket front wall portion attached to the rear wall portion of the outer reinforcement; and a bracket side wall portion extending from the bracket front wall portion and bending towards the rear side of the vehicle with a bend line formed and be attached to the front pillar inner portion.

3. The vehicle front pillar structure according to claim 1, wherein a cowl extends between the pair of front pillars, the vehicle front pillar structure comprises a mounting bracket attaching, to the front pillar inner portion, a side bracket at each of end portions of the instrument panel reinforcement extending along a transverse axis of the vehicle, and the mounting bracket is shorter, along a longitudinal axis of the vehicle, than a distance of a clearance between the side bracket and the cowl.

4. The vehicle front pillar structure according to claim 3, wherein the front pillar inner portion comprises a region which is not covered by the mounting bracket along the longitudinal axis of the vehicle in the clearance between the side bracket and the cowl, and the region is accessible by an operator for manual work.

* * * * *